Sept. 28, 1965  O. A. BECKER ETAL  3,208,723
DENTAL TURBINE
Filed Sept. 13, 1963  2 Sheets-Sheet 2
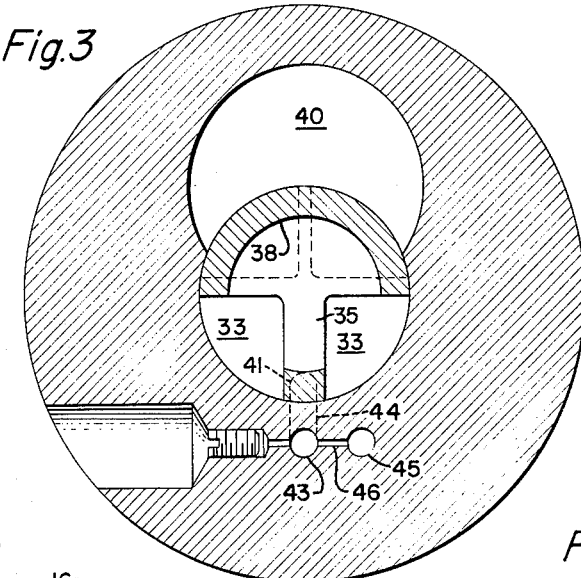
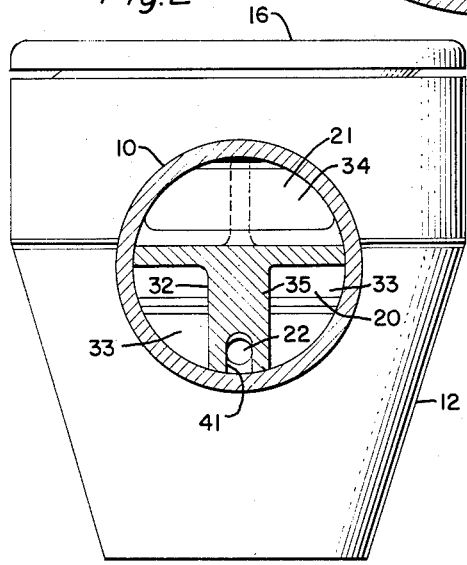
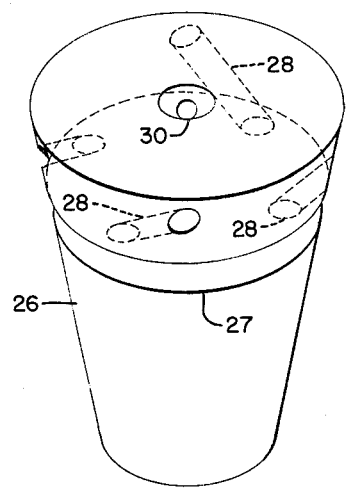
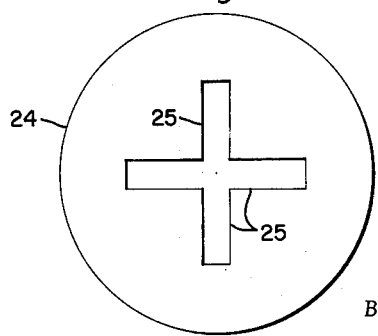
INVENTORS
OTTO A. BECKER
ARMAND BOSCO
EARL S. CAIN, JR.
GENE L. GREEN
BY
ATTORNEY ём
United States Patent Office 3,208,723
Patented Sept. 28, 1965

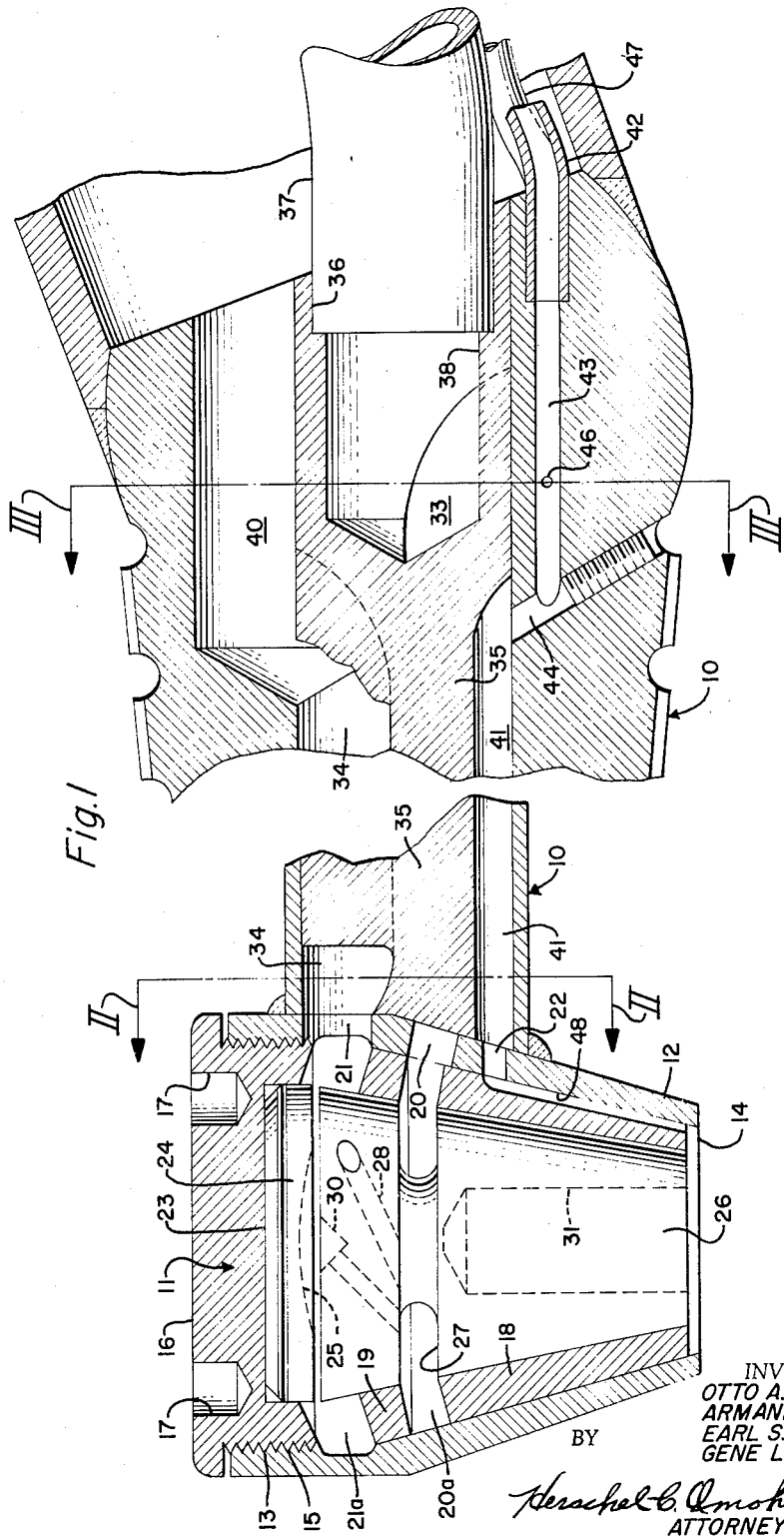

3,208,723
DENTAL TURBINE
Otto A. Becker, Phoenix, and Armand Bosco, Scottsdale, Ariz., Earl S. Cain, Jr., Palo Alto, Calif., and Gene L. Green, Phoenix, Ariz., assignors to The Garrett Corporation, Los Angeles, Calif., a corporation of California
Filed Sept. 13, 1963, Ser. No. 308,832
7 Claims. (Cl. 253—3)

This invention relates generally to fluid pressure energy translating mechanism and more particularly to fluid pressure operated turbines. Still more particularly, the invention relates to air operated turbine motors of miniature size designed for extremely high speed operation and with the operating fluid serving as the sole lubricating medium.

One of the objects of this invention is to provide a miniature air turbine suitable for use as a motor to directly drive a dental bur, the turbine being designed to operate in the range from 200,000 to and exceeding 500,000 r.p.m. and to be light in weight to facilitate handling and reduce operator fatigue.

Another object of the invention is to provide a miniature air turbine which may be disposed on the end of a dental handpiece, the size of the turbine making it most suitable for use in a patient's mouth and the shape providing for the best visibility by the dentist of the tooth being worked upon.

Still another object of the invention is to provide the turbine rotor and chamber therefor with a particular shape which forms combined radial and thrust bearing surfaces, the operating fluid being employed to lubricate and/or support the rotor, the shape and size relation of the rotor and its bearing surfaces being such as to permit the application of side forces, as well as axial thrust, to the tool being driven by the turbine.

A further object of the invention is to provide a fluid pressure operated turbine having a rotor of frustoconical form and a bearing surface of similar form, the rotor having means for receiving and holding a tool so that it projects from the small end of the rotor whereby the engagement of the tool and work with relatively light force will tend to separate the conical bearing and rotor surfaces and thus permit some of the driving pressure fluid to flow therebetween to lubricate and support the rotor.

A still further object of the invention is to provide the rotor of the fluid pressure operated turbine mentioned in the preceding paragraph with a plurality of jet nozzles from which the driving pressure fluid issues at relatively high velocity to effect the operation of the turbine.

Another object of the invention is to provide the turbine mentioned in the two preceding paragraphs with a thrust bearing at the large end to resist movement of the rotor away from the conical bearing surface, a passage being provided in at least one part of the turbine to admit operating fluid under pressure to such thrust bearing whereby the rotor will be lubricated at all times and particularly when the tool is engaged with the work.

Still another object of the invention is to provide the thrust bearing mentioned in the preceding paragraph with means for distributing the pressure fluid supplied thereto over a predetermined portion of the area of potential engagement between the rotor and the thrust bearing surface to insure the lubrication of the relatively movable surfaces.

Other objects and advantages of the invention will be made apparent by the following description of one form of the invention which has been illustrated in detail in the accompanying drawing.

In the drawings:
FIG. 1 is a fragmentary longitudinal sectional view taken through a dental handpiece in which a turbine formed in accordance with the present invention has been incorporated;

FIG. 2 is a vertical sectional view taken through the handpiece on the plane indicated by the line II—II;

FIG. 3 is a similar view on the plane indicated by the line III—III;

FIG. 4 is a perspective view of the rotor of the turbine; and

FIG. 5 is a bottom elevational view of a thrust bearing employed in the turbine.

Referring more particularly to the drawing, the numeral 10 designates the handpiece on the forward end of which is provided a turbine 11 forming the subject matter of this invention. It should be obvious that, although the turbine is shown in connection with a dental handpiece and has been particularly designed for operating dental devices, the turbine is applicable to any other uses to which it may be adapted.

The turbine comprises a casing 12 which is of generally frusto-conical formation, the casing being open at both top and bottom 13 and 14. The casing at the top is threaded as at 15 for the reception of a cap 16, the form of the cap illustrated being provided with openings 17 for the reception of a spanner wrench used to remove and replace the cap. The casing provides a frustoconical chamber in which one or more liners 18 and 19 are disposed, two liners being used in the form of the invention illustrated. The casing is secured at one side to the handpiece, the form of the latter illustrated being of circular cross section, the casing having a plurality of openings 20, 21 and 22 formed therein in such positions that they will open to the inside of the handpiece when the casing is disposed thereon. When two liners are employed, they are of such size that they will be disposed in longitudinally spaced relationship in the casing, the space 20a between the liners registering with the opening 20 in the casing. The liner 19 is so disposed in the casing that it will be positioned at the lower edge of the opening 21. The openings 20 and 21 constitute an inlet and an outlet respectively for the casing. By terminating the insert 19 adjacent the lower edge of the opening 21, a space 21a between the insert and the underside of the cap 16 will be provided. This space communicates with the outlet 21 and serves as a collector for spent operating fluid and lubricant. The liners 18 and 19 may be formed of any material suitable for bearing purposes, carbon having been used in a prototype constructed according to the invention.

The cap 16 has its underside formed with a recess 23 for the reception of a disk 24, this disk also being formed of carbon to serve as a thrust bearing. The underside of the disk has a cross-shaped recess 25 formed therein, as illustrated in FIG. 5. The purpose of the recess will be made apparent in the following description.

The frusto-conical chamber formed by the inserts receives the rotor 26 of the turbine, this rotor also being of frusto-conical configuration, and of a size such that when it is disposed in the chamber provided by the liners a small clearance will exist between the top end surface of the rotor and the underside of the disk 24. This clearance receives some of the operating fluid which serves as a lubricant during the operation of the turbine. The rotor 26 is provided intermediate the length of the side wall with an annular recess or groove 27, this groove registering with the space between the inserts 18 and 19. The rotor is further provided with a plurality of drilled openings 28 which enter the rotor from the upper portion of the side wall and terminate in the recess 27. The openings 28 constitute jet outlet nozzles, the outer ends being disposed to discharge fluid into the space 21a. It will be noted that the jet nozzle outlets extend angularly into the rotor and therefore will discharge fluid substantially tangentially from the rotor into the space 21a. This discharge of fluid under pressure will impart rotary movement to the rotor. Some of the fluid admitted to the inlet will flow into the space between the rotor and the liner and serve as lubrication, or the rotor will float on this fluid to prevent undue friction between the rotor side walls and the liners.

To further lubricate the rotor or support it for rotation, fluid is introduced into the space between the top end wall of the rotor and the disk 24. This admission of fluid takes place through another opening 30 formed in the rotor and extending from the center of the top wall angularly to the groove 27. By locating the outlet end of the opening 30 at the center, this fluid under pressure will be admitted to the center of the cross-shaped recess 25 in the bearing disk 24. The radiating arms of the cross-shaped recess will tend to distribute the fluid over a predetermined area of the upper end of the rotor and provide the thrust force required to exactly counterbalance that built up in the conical bearing around the side of the rotor. As a result of this design, the rotor floats at all times during operation on air under pressure.

As shown by dotted lines in FIG. 1, the rotor is provided with a central socket 31 which enters the rotor from the lower end. This socket accommodates a chuck (not shown) to receive and hold the dental bur or other instrument to be driven by the rotor. This instrument will project through the open lower end of the casing for engagement with the work. The force transmitted by the bur or other instrument to the rotor when the work is engaged will be opposed by the fluid pressure existing between the upper end of the rotor and the bearing disk 24.

As illustrated in FIGS. 2 and 3, the handle portion of the dental handpiece is circular in cross section. The interior of the handpiece, which is of generally tubular formation, is divided by a member 32, which is of generally cross-shaped cross section. This divider member separates the tubular handpiece into a plurality of passages 33 and 34, the passages 33 being provided by the horizontal section of the cross-shaped member and the lower arm 35 of such member.

As illustrated in FIGS. 1 and 3, the outer end of this divider member is circular in cross section and has a central bore 36 formed therein to receive the end of a tube 37 through which fluid under pressure is supplied to the handpiece. Under normal operating conditions, the fluid used is compressed air. The central bore 36 has an extension 38 which enters the divider member and intersects part of the cross-shaped portion so that bore 38 will communicate with the passages 33. These passages communicate with the ends of the opening 20 formed in the casing wall and thus admit fluid under pressure to the inlet. The passages 34 in the upper portion of the handpiece communicate with the outlet 21 and conduct the spent fluid from the turbine. These passages communicate with a recess 40 eccentrically drilled into the outer portion of the handpiece. The eccentric opening 40 communicates with the interior of the handpiece beyond the end of the divider 32 to conduct exhaust air to a suitable point of discharge.

As illustrated in FIGS. 1 and 2, the lower branch of the divider member 35 has a longitudinally extending recess 41 formed therein. This recess is closed at the bottom by the wall of the handpiece to form a passage which communicates at one end with a small tube 42 through a plurality of drilled holes 43 and 44 formed in the outer portion of the handpiece. The tube 42 receives, from a suitable source (not shown), water or other desirable fluid used to expel material removed from the teeth by the dental bur. The tube 42 delivers the water to the drilled holes 43 and 44 for admission to the passage 41. As shown in FIG. 3, the outer end portion of the handpiece has additional drilled holes 45 and 46, the former entering the handpiece from the outer end parallel to and at one side of the hole 43. This hole 45 communicates with a tube 47 through which air or the like from a suitable source is supplied to the hole 45. The hole 46 extends at right angles to holes 43 and 45 and establishes limited communication therebetween to admit air to the hole 43 for mixture with the liquid supplied thereto to create a mist. It will be observed, from FIG. 3, that hole 46 is quite restricted to form a jet. This mist flows through hole 44 to the passage 41. Passage 41 communicates with the opening 22 formed in the casing, this opening in turn communicating with a slot 48 formed in the outer side wall of the liner 18. The slot 48 is open at its lower end and, due to the inclination of the casing wall, is directed toward the bur carried by the rotor. Suitable control mechanism will govern the admission of water and other fluid to the tubes 42 and 47.

It is believed that the operation of the turbine should be apparent from the foregoing description. In summary, however, it may be stated that air or other fluid under pressure is supplied to the inlet 20 through the tube 37, opening 38, and passages 33. This fluid will flow from the inlet 20 to the recess 27, some of the fluid flowing through the jet nozzles 28 and discharging under pressure into the space 21a. This discharge of fluid tangentially from the rotor will impart rotary movement thereto. Such rotary movement tends to cause the rotor to separate from the bearing liners and thus admit fluid under pressure to the spaces between the rotor and the inserts 18, 20 and 24, this fluid serving to cause the rotor to float in its chamber. Fluid discharged from the nozzles 28 and escaping from the spaces between the rotor and its bearing walls will flow from the casing, through the outlet 21 and passage 34, opening 40, and the interior of the handpiece to a suitable point of discharge.

We claim:

1. A fluid pressure energy translating device comprising:
    (a) casing means providing a frusto-conical chamber with a closed large end, said chamber having a frusto-conical bearing forming side wall with an inlet for fluid under presure intermediate the conical side wall and an outlet; and
    (b) smooth surfaced rotor means shaped to closely fit the frusto-conical bearing forming side wall of the chamber, said rotor means being formed with substantially tangentially discharging jet nozzle passages communicating with said inlet and discharging into said outlet to impart rotary movement to said rotor means, one of said means having a passage to conduct fluid under pressure from said inlet to the space between said rotor means and the closed end of said chamber.

2. A fluid pressure energy translating device comprising:
    (a) casing means providing a frusto-conical chamber with a closed large end, said chamber having a frusto-conical bearing forming side wall with an inlet for fluid under pressure intermediate the conical side wall and an outlet adjacent the closed end of the chamber; and
    (b) smooth surfaced rotor means shaped to closely fit the frusto-conical bearing forming side wall of the chamber, said rotor means being formed with substantially tangentially discharging jet nozzle passages communicating with said inlet and discharging into said outlet to impart rotary movement to said rotor means, one of said means having a passage to conduct fluid under pressure from said inlet to the space between said rotor means and the closed end of said chamber, said space having restricted communication with said chamber outlet.

3. A fluid pressure energy translating device comprising:
    (a) casing means providing a frusto-conical chamber with a closed large end, said chamber having an inlet for fluid under pressure intermediate the conical side wall and an outlet adjacent the closed end of the chamber;

(b) a frusto-conical liner of bearing material disposed in said chamber, said liner having an annular opening communicating with said chamber inlet; and (c) smooth surfaced rotor means shaped to closely fit the liner, said rotor means being formed with jet nozzle passages communicating with the annular opening in said liner and discharging substantially tangentially into said outlet to impart rotary movement to said rotor means, one of said means having a passage to conduct fluid under pressure from said inlet to the space between said rotor means and the closed end of said chamber.

4. A fluid pressure energy translating device comprising:

(a) casing means providing a frusto-conical chamber with a closed large end, said chamber having an inlet for fluid under pressure intermediate the conical side wall and an outlet adjacent the closed end of the chamber;

(b) a frusto-conical liner of bearing material disposed in said chamber, said liner having an annular opening communicating with said chamber inlet;

(c) a disk formed of bearing material supported at the closed end of said chamber; and (d) smooth surfaced rotor means shaped to closely fit the liner, said rotor means being formed with jet nozzle passages communicating with the annular opening in said liner and discharging substantially tangentially into said outlet to impart rotary movement to said rotor means, one of said means having a passage to conduct fluid under pressure from said inlet to the space between said rotor means and the disk supported at the closed end of said chamber.

5. A fluid pressure energy translating device comprising:

(a) casing means providing a frusto-conical chamber with a closed large end, said chamber having an inlet for fluid under pressure intermediate the conical side wall and an outlet adjacent the closed end of the chamber;

(b) a frusto-conical carbon liner disposed in said chamber, said liner having an annular recess communicating with said chamber inlet;

(c) a carbon disk supported at the closed end of said chamber; and (d) smooth surfaced rotor means shaped to closely fit the liner, said rotor means having an annular groove formed in the conical side wall thereof in communication with the recess in said liner and jet nozzle passages leading from said annular groove to said outlet to discharge fluid substantially tangentially thereto to impart rotary movement to said rotor means, said rotor also having a passage leading from said annular groove to the space between said rotor means and the carbon disk supported at the closed end of said chamber.

6. A fluid pressure energy translating device comprising:

(a) casing means providing a frusto-conical chamber with a closed large end, said chamber having an inlet for fluid under pressure intermediate the conical side wall and an outlet adjacent the closed end of the chamber;

(b) a frusto-conical carbon liner disposed in said chamber, said liner having an annular recess communicating with said chamber inlet;

(c) a carbon disk supported at the closed end of said chamber, said disk being provided with a recess of predetermined shape on the side exposed to said chamber; and (d) rotor means shaped to closely fit the liner, said rotor means having an annular groove formed in the conical side wall thereof in communication with the recess in said liner and jet nozzle passages leading from said annular groove to said outlet to discharge fluid thereinto to impart rotary movement to said rotor means, said rotor means also having a passage leading from said annular groove to the recess in said carbon disk to supply fluid under pressure thereto, said recess serving to distribute fluid under pressure over a predetermined area of said rotor means.

7. A fluid pressure energy translating device comprising:

(a) casing means having a body providing a frusto-conical chamber and a cap closing the larger end of the chamber, said cap having a recess, said body having an inlet intermediate the conical side of said chamber and an outlet adjacent the inner edge of said cap;

(b) a frusto-conical carbon liner disposed in said chamber, said liner having an annular recess communicating with said inlet;

(c) a carbon disk positioned in the recess in said cap, said disk having a recess with radiating portions formed on the side thereof exposed to said chamber; and (d) rotor means shaped to closely fit the liner, said rotor means having a flat end surface disposed in closely spaced relation to said disk and an annular groove in the conical side wall in communication with the recess in said liner, said rotor means having jet nozzle passages leading from said annular groove to said outlet to discharge fluid thereinto to impart rotary movement to said rotor means, said rotor means also having a passage leading from said annular groove to the flat end surface to supply fluid under pressure to the recess in said disk for distribution thereby over a predetermined area of said flat end surface.

References Cited by the Examiner

UNITED STATES PATENTS

| | | | |
|---|---|---|---|
| 773,442 | 10/04 | Webb. | |
| 2,276,404 | 3/42 | Lundquist | 103—88 |
| 2,779,637 | 1/57 | Schaefer | 308—160 |
| 3,055,112 | 9/62 | Borden | 253—2 |
| 3,147,951 | 9/64 | Cain et al. | 253—2 |

KARL J. ALBRECHT, *Primary Examiner.*

HENRY F. RADUAZO, *Examiner.*